Oct. 4, 1960 — T. R. THOMAS — 2,954,844
LUBRICANT COALESCING FITTING
Filed May 8, 1957 — 2 Sheets-Sheet 1
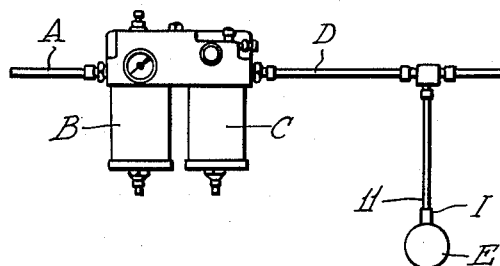
Fig.1.
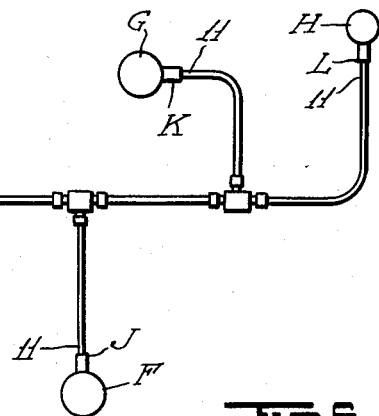
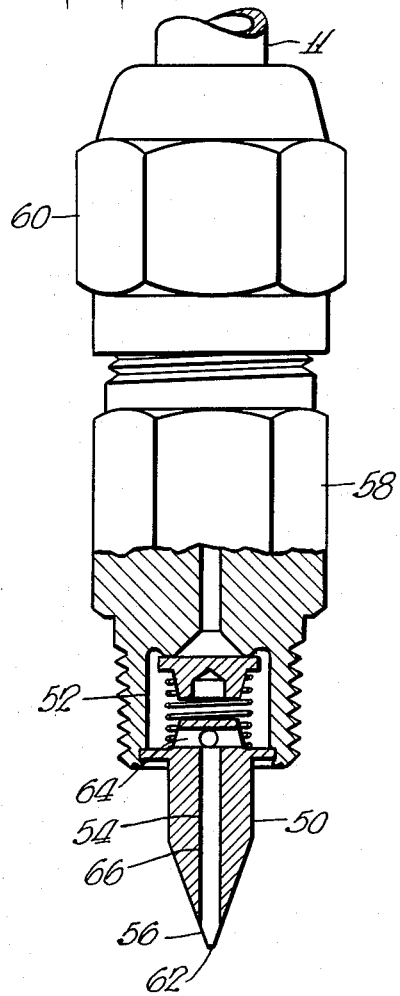
Fig.5.
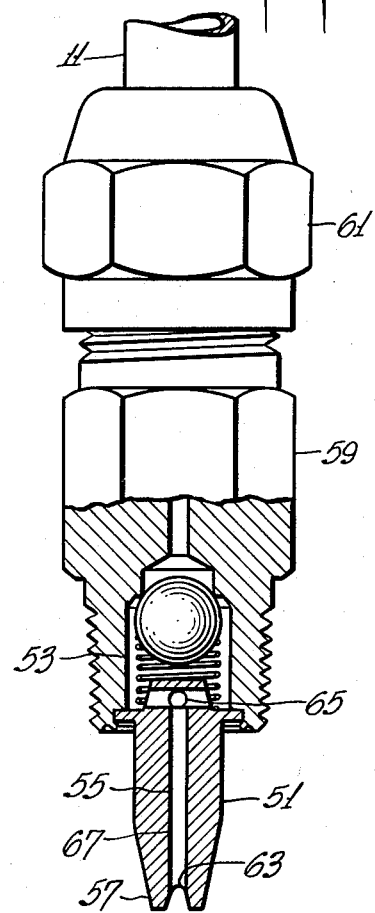
Fig.6.
INVENTOR
Thomas R. Thomas
BY
Dean Fairbank & Hirsch
ATTORNEYS Oct. 4, 1960 T. R. THOMAS 2,954,844
LUBRICANT COALESCING FITTING
Filed May 8, 1957 2 Sheets-Sheet 2
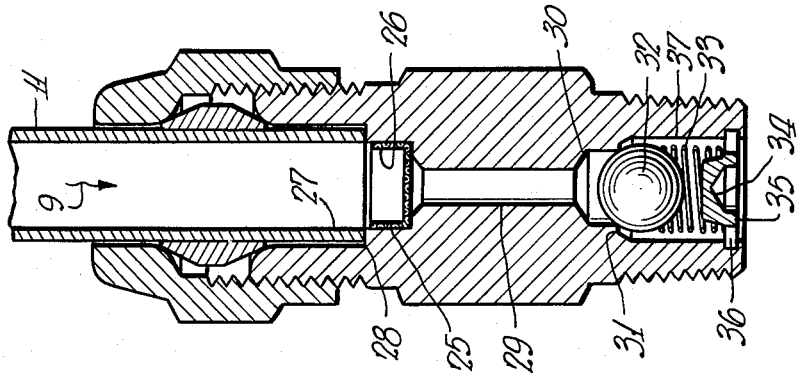
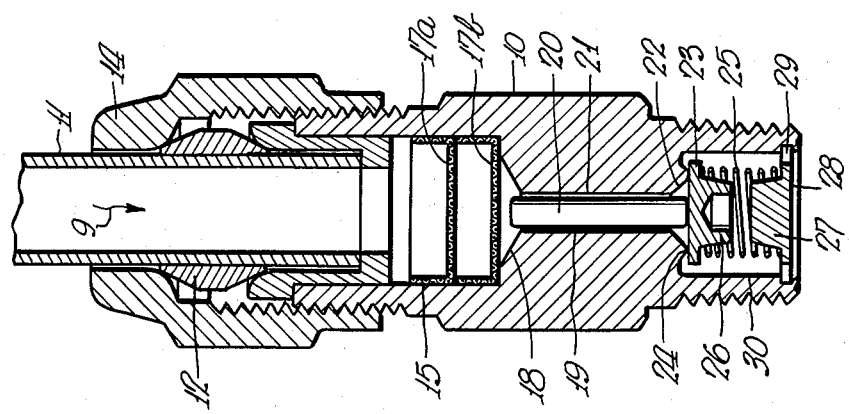
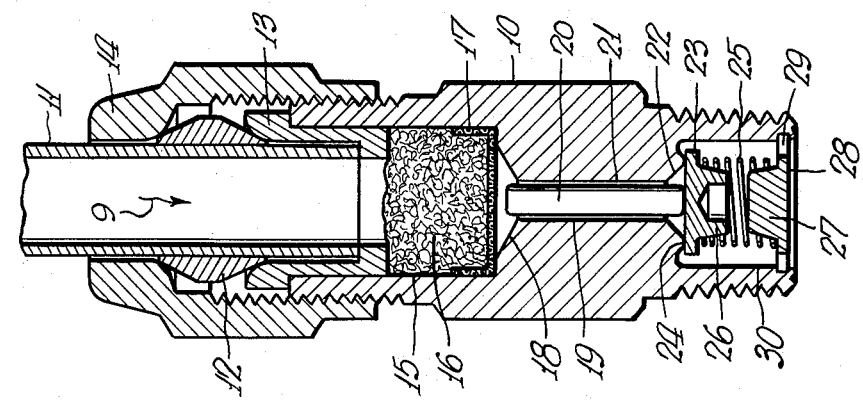
INVENTOR
Thomas R. Thomas
BY
Dean Fairbank + Hirsch
ATTORNEYS

United States Patent Office

2,954,844
Patented Oct. 4, 1960

2,954,844
LUBRICANT COALESCING FITTING

Thomas R. Thomas, New York, N.Y., assignor to Auto Research Corporation, Dover Green, Del., and Boonton, N.J., a corporation of Delaware Filed May 8, 1957, Ser. No. 657,775

1 Claim. (Cl. 184—7)

The present invention relates to a lubricant distributing installation and it particularly relates to a system for distributing lubricant in finely divided fog or mist form. In copending application, Serial No. 657,807, filed May 8, 1957, there is disclosed a method of creating a fog or mist lubricant which is then transmitted to bearings, where the mist or fog is deposited in the bearing structure.

It is among the objects of the present invention to provide a simple outlet system which will assure separation and deposit of the oil or lubricant particles carried in the fog or mist upon the bearing or in the location where the lubricant is to be applied.

Another object is to provide a system of oil metering or distributing fittings which will effectively distribute and proportion the lubricant to the various bearings.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

It has been found that the lubricant, when carried in the form of a mist or fog, may be effectively removed for application in droplet form by successively straining, metering and valving the flow.

In the preferred form of the invention the oil mist or fog containing particles less than 15 microns in size, and desirably 1 to 20 microns in size, is conveyed through piping or conduits through a simple series to the bearings, where they are caused to flow or pass through a flow metering fitting.

These flow metering fittings may be screwed or fitted directly into the bearings, and they may be provided with flow outlet nuts with nozzles or projectors for carrying the droplets of oil into the bearing structures. Desirably, the fittings have inlet strainers or filters, a central restricted bore which will give the proportionment for distribution of the fog, together with an outlet check valve or non-return valve, desirably spring-seated.

In the preferred form of the invention the restricted passage is provided with a pin, although in many cases the pin may be omitted and the full passage may be of the desired proportionment.

Although not limited thereto, the tubing may be of nylon or brass or copper, with an internal bore ranging from 3/16 to 1/4 inch, and with branch pipes leading to the bearing. The restricted passageways may be 5/16 of an inch in length with a clearance varying from .028 to .078 inch.

Where desired to give different proportionments and restrictions, an opening of 5/16 of an inch in length and .052 of an inch in diameter may receive a pin of .044 or .033 of an inch, which will give respectively clearances of .008 and .019 of an inch.

On the other hand, the 5/16 of an inch passage may have a diameter of 0.125 of an inch, with pins being positioned therein having diameters of 0.113 or 0.097 or in such case the pin may be altogether omitted.

These restricted openings will cause the fine mist which will be carried through the tubing or conduits to coalesce and be deposited upon the surface in or adjacent the bearing into which they will then flow. Such fittings may have external diameters ranging from 3/8" to 1/2" hexagon and lengths ranging from .75 to 1.25 inches, and, if desired, these fittings may be used in series to give the desired effect.

It has been found undesirable to provide fixed baffles at the outlets of the fittings, since these interfere with the coalescence and flow of the lubrication to the bearings.

It is desirable to use, after the restricted passage, a check valve—desirably spring-seated—which will aid the coalescence of the mist or fog into larger particles.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:

Fig. 1 is a diagrammatic lay-out of the lubricant distribution system, according to the present invention.

Fig. 2 is a longitudinal sectional view of one form of outlet fitting, according to the present invention.

Fig. 3 is a longitudinal sectional view of an alternative embodiment with a modified inlet strainer assembly.

Fig. 4 is a longitudinal sectional view showing a ball check valve arrangement.

Fig. 5 is a side elevational view, partly in section, of an alternative outlet fitting construction director outlet spout.

Fig. 6 is a longitudinal side elevational view similar to Fig. 5, partly in section, of an alternative outlet construction.

Referring to Fig. 1, the line A is the air supply line from the compressor which passes air into a filter chamber B. This air under pressure then passes into a fog generating chamber C, which results in the fog being forced into the branch conduit system D.

The branch distributing system D feeds the bearings E, F, G and H, which are provided with the flow restriction metering fittings I, J, K and L, to which this invention is most particularly directed.

Referring to Fig. 2, there is shown the fog or mist solidifier fitting having a body 10 which receives the inlet tubing 11, held in place by the compression coupling sleeve 12, which is clamped between the thimble 13 and the coupling nut 14. The body 10 has a recess 15 which receives the filter 16 with the strainer cup 17.

The recess has a well portion 18 which empties into the restricted passage 19, receiving the pin 20. The pin 20 will form a narrow annular restriction passage 21 which will terminate in an enlargement 22 directly above the spring-seated valve cup 23.

This valve cup 23 is normally pressed against the annular valve seat 24 by the spring 25. The spring 25 encircles the annular nipple 26 and also the dome 27 on the valve retainer 28. The valve retainer 28 has the openings 29 around the periphery thereof, which prevent ready flow of the lubricant from the valve pocket 30 into the bearing structure, such as indicated at E, F, G and H.

The fog or mist containing the particles finer than 50 microns, and desirably from 10 to 20 microns, will first be solidified in passing through the strainer 16.

As the particles pass through the restricted passageway 21 and pass the spring-seated valve 23, this solidified lubricant will then collect in the valve chamber 30 and flow into the bearings, with the extra air escaping through the bearing structure.

The important feature of the fitting of Fig. 2 is that it progressively causes the micron sizes of the particles to increase as they pass through the filter, the pin restriction and the spring-seated valve, so that the droplets of lubricant will collect in the outlet chamber 30 and flow into the bearing.

Referring to the fitting of Fig. 3, the parts are the same as indicated in Fig. 2, except that a double strainer cup 17a and 17b is employed. This double strainer cup arrangement appears to aid in the solidification and increase in size of the particles of lubricant or oil.

The other parts in Fig. 3 are the same as in Fig. 2, except for the change in the strainer construction.

In the structure of Fig. 4 the parts are the same, except for the reduced inlet chamber 25 which receives the cup-shaped strainer 26. In this structure, the end 27 of the pipe fits directly upon the shoulder 28. The strainer 26 will feed lubricant into the restricted passage 29, which does not contain a pin as in Figs. 2 and 3.

The outlet chamber 30 has a stepped valve seat 31 against which is pressed the ball 32. The ball is pressed against the seat 31 by the coil spring 33. The spring at its other end is received on the hollow chamber 34 of the valve retainer 35, which has the peripheral passages 36 to permit flow of lubricant.

In the fitting of Fig. 4, the lubricant fog passing inwardly from the piping 11 in the direction of the arrow 9 will be subjected to successive condensation or solidification of the cup strainer 26, the restricted passage 29 and the other check 32. The solidified, large droplets will collect in the outlet valve chamber 37 and will flow thence to the bearing.

The fittings of Figs. 5 and 6 are similar to those shown in Figs. 2, 3 and 4, except that they have the outlet nozzles 50 and 51, which respectively conduct the lubricant from the outlet chambers 52 and 53 through the central passageways 54 and 55 to drip or drop at the ends 56 and 57 onto or into the bearing structure.

The bodies 58 and 59 receive the compression coupling nuts 60 and 61 and the inlet tubing 11.

It will be noted that the outlet connection in Fig. 5 has a sharp end portion 62, while the outlet fitting in Fig. 6 has a recessed portion 63. These connections will permit controlled drip or passage of the condensed lubricant on to the bearings.

Essentially, the present invention revolves in the sequential condensation of a mist or fog of lubricant or oil particles by passage through a strainer, a restricted passage which may be pin-restricted, into a valve chamber where a reciprocating valve will aid in the final condensation and expulsion of the droplets of lubricant into the bearing structure. It will be noted that the outlet fittings in Figs. 5 and 6 have transverse flow passages 64 and 65 which pick up the lubricant from the outlet chambers 52 and 53 and permit the lubricant to flow into the central bores 66 and 67. The elongated elements 50 and 51 in Figs. 5 and 6 constitute a fourth condensation element to restrict and condense the lubricant and particles.

As many changes could be made in the above lubrication, and many widely different embodiments of this invention could be made without department from the scope of the claim, it is intended that all matters contained in the above description shall be interpreted as illustrative and not in a limiting sense.

Having now particularly described and ascertained the nature of the invention, and in what manner the same is to be performed, what is claimed is:

A proportioning lubricant mist solidification fitting to condense finely divided lubricant mist particles of about ten to twenty microns in size and to cause such condensed particles to drip as drops into a bearing being lubricated, said fitting having an enlarged diameter outlet chamber and a restricted connecting passageway leading thereto, an elongated conical drip nozzle at the outlet end of the fitting, said conical nozzle having an enlarged inlet end and also having an elongated axial flow passage, the inlet end of said nozzle fitting into and blocking the outlet end of said outlet chamber, a spring-biased check valve in said outlet chamber, a dome in said outlet chamber below said check valve and seated on said conical nozzle, said rome having a flow passage transverse to the axial flow passage of said conical nozzle, said transverse flow passage being adapted to pick up lubricant from said outlet chamber and permit the same to flow into the axial flow passage of said nozzle.

References Cited in the file of this patent

UNITED STATES PATENTS

| | | |
|---|---|---|
| 1,845,827 | Bijur | Feb. 16, 1932 |
| 2,139,659 | Bijur | Dec. 13, 1938 |
| 2,331,984 | Kocher | Oct. 19, 1943 |
| 2,753,953 | Tear | July 10, 1956 |
| 2,772,750 | Bystricky | Dec. 4, 1956 |

FOREIGN PATENTS

| | | |
|---|---|---|
| 629,554 | Great Britain | Sept. 22, 1949 |
| 677,193 | Great Britain | Aug. 13, 1952 |